(12) United States Patent
Sakai

(10) Patent No.: US 6,397,289 B1
(45) Date of Patent: May 28, 2002

(54) DISK CONTROL APPARATUS

(75) Inventor: Tomohiro Sakai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/249,325

(22) Filed: Feb. 12, 1999

(30) Foreign Application Priority Data

Feb. 16, 1998 (JP) .......................................... 10-050170

(51) Int. Cl.⁷ ............................................. G06F 12/00
(52) U.S. Cl. ............................ 711/1; 341/50; 717/106; 717/136
(58) Field of Search ............................ 711/1, 202–206; 717/106, 136; 341/50; 709/246

(56) References Cited

U.S. PATENT DOCUMENTS 6,016,396 A * 1/2000 Mochizuki ...................... 717/6

FOREIGN PATENT DOCUMENTS

| JP | 61-127028 | 6/1986 |
| JP | 61-253673 | 11/1986 |
| JP | 62-232063 | 10/1987 |
| JP | 01-309117 | 12/1989 |
| JP | 3-27427 | 2/1991 |
| JP | 05-067023 | 3/1993 |
| JP | 6-168074 | 6/1994 |
| JP | 06-326744 | 11/1994 |

OTHER PUBLICATIONS

Japanese Office Action dated Oct. 31, 2001 with Partial English Translation.

* cited by examiner

Primary Examiner—Do Hyun Yoo
Assistant Examiner—Nasser Moazzami
(74) Attorney, Agent, or Firm—McGinn & Gibb, PLLC

(57) ABSTRACT

A disk control apparatus includes a control circuit and a code conversion circuit. The control circuit analyzes read/write commands transmitted from a plurality of host computers using different coding schemes, and recognizes a code conversion mode which indicates execution/inexecution of code conversion and a code conversion direction. The code conversion circuit performs code conversion for data to be read/write from/in a plurality of disk storage units using different coding schemes.

7 Claims, 6 Drawing Sheets

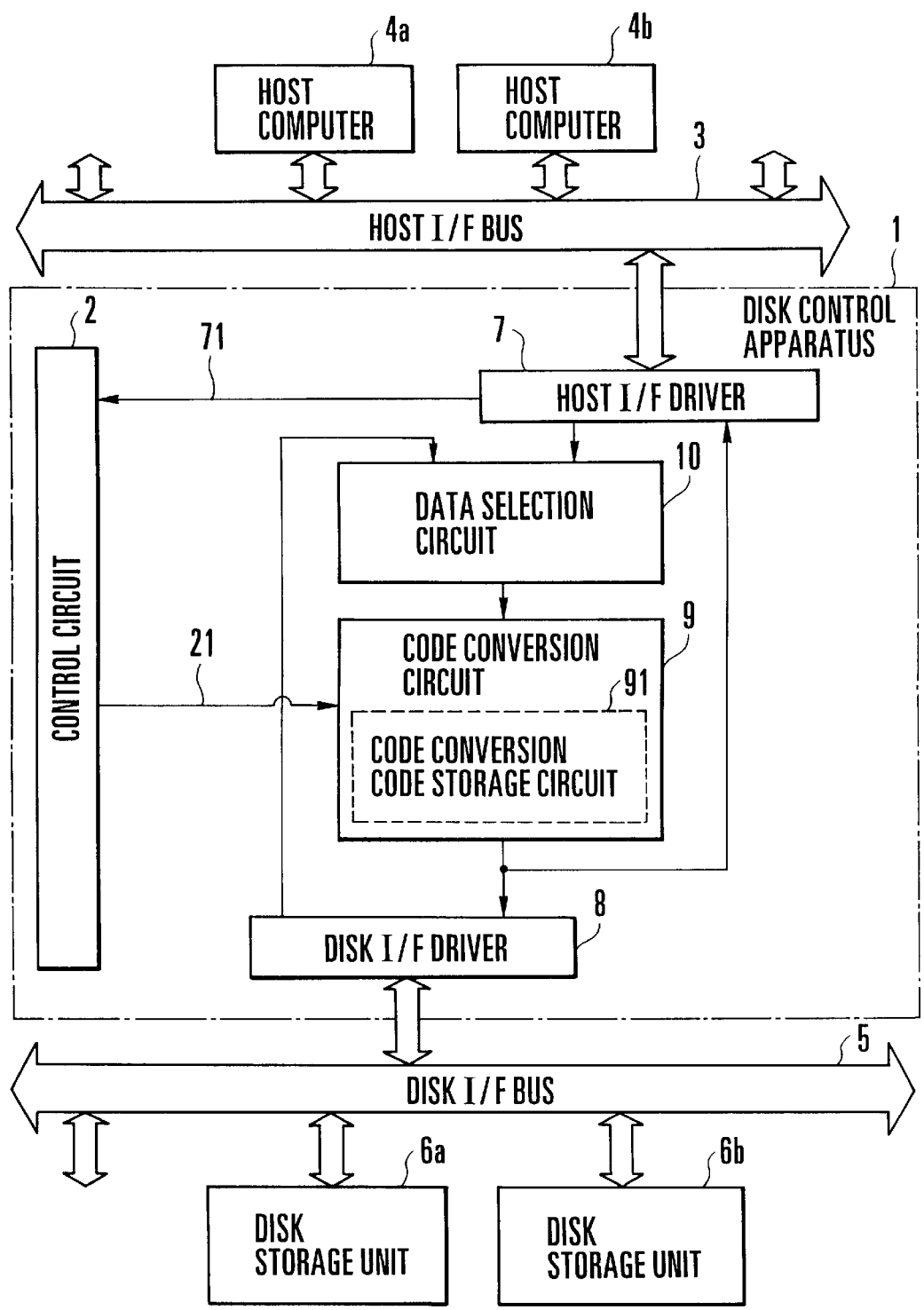
F I G. 1

FIG. 2

| Byte \ Bit | 7 | 6 | 5 | 4 | 3 | 2 | 1 | 0 |
|---|---|---|---|---|---|---|---|---|
| 0 | \multicolumn{8}{c\|}{Command Code (Read : E8h / Write : EAh)} |
| 1 | \multicolumn{2}{c\|}{LUN} | \multicolumn{3}{c\|}{DPO} | FUA | Reserved | RelAdr |
| 2 | MSB | | | | | | | |
| 3 | | | | Logical Block Address | | | | |
| 4 | | | | | | | | |
| 5 | | | | | | | | LSB |
| 6 | \multicolumn{4}{c\|}{Source Code Type} | \multicolumn{4}{c\|}{Destination Code Type} |
| 7 | MSB | | | Block Length | | | | |
| 8 | | | | | | | | LSB |
| 9 | \multicolumn{5}{c\|}{Reserved} | NACA | Flag | Link |

(Note: table structure approximated — byte 1 fields: bits 7-6 LUN, bit 5 DPO, bit 4 FUA, bits 3-1 Reserved, bit 0 RelAdr; byte 6: bits 7-4 Source Code Type, bits 3-0 Destination Code Type; byte 9: bits 7-3 Reserved, bit 2 NACA, bit 1 Flag, bit 0 Link)

F I G. 3

| ADDRESS (CODE CONVERSION MODE) | (INPUT DATA) | OUTPUT DATA | |
|---|---|---|---|
| 00000000 | 00000000<br>00000001<br>..<br>11111111 | 00000000<br>00000001<br>..<br>11111111 | CODE CONVERSION MODE = INEXECUTION OF CODE CONVERSION |
| 00000001 | 00000000<br>00000001<br>..<br>11111111 | CORRESPONDING DATA<br>CORRESPONDING DATA<br>CORRESPONDING DATA<br>CORRESPONDING DATA | CODE CONVERSION MODE = EXECUTION OF CODE CONVERSION ( A → B ) |
| 00000010 | 00000000<br>00000001<br>..<br>11111111 | CORRESPONDING DATA<br>CORRESPONDING DATA<br>CORRESPONDING DATA<br>CORRESPONDING DATA | CODE CONVERSION MODE = EXECUTION OF CODE CONVERSION ( B → A ) |
| ........ | ........ | ........ | |

91

| CODE CONVERSION TYPE 1 | HOST COMPUTER IDENTIFIER = ID 1 |
|---|---|
| | DISK STORAGE UNIT IDENTIFIER = ID 3 |
| | DATA TRANSFER DIRECTION = READ |
| | CODE CONVERSION MODE = Source Code Type = A. Destination Code Type = A |
| CODE CONVERSION TYPE 2 | HOST COMPUTER IDENTIFIER = ID 1 |
| | DISK STORAGE UNIT IDENTIFIER = ID 4 |
| | DATA TRANSFER DIRECTION = READ |
| | CODE CONVERSION MODE = Source Code Type = B. Destination Code Type = A |
| CODE CONVERSION TYPE 3 | HOST COMPUTER IDENTIFIER = ID 2 |
| | DISK STORAGE UNIT IDENTIFIER = ID 3 |
| | DATA TRANSFER DIRECTION = READ |
| | CODE CONVERSION MODE = Source Code Type = A. Destination Code Type = B |
| CODE CONVERSION TYPE 4 | HOST COMPUTER IDENTIFIER = ID 2 |
| | DISK STORAGE UNIT IDENTIFIER = ID 4 |
| | DATA TRANSFER DIRECTION = READ |
| | CODE CONVERSION MODE = Source Code Type = B. Destination Code Type = B |
| CODE CONVERSION TYPE 5 | HOST COMPUTER IDENTIFIER = ID 1 |
| | DISK STORAGE UNIT IDENTIFIER = ID 3 |
| | DATA TRANSFER DIRECTION = WRITE |
| | CODE CONVERSION MODE = Source Code Type = A. Destination Code Type = A |
| CODE CONVERSION TYPE 6 | HOST COMPUTER IDENTIFIER = ID 1 |
| | DISK STORAGE UNIT IDENTIFIER = ID 4 |
| | DATA TRANSFER DIRECTION = WRITE |
| | CODE CONVERSION MODE = Source Code Type = A. Destination Code Type = B |
| CODE CONVERSION TYPE 7 | HOST COMPUTER IDENTIFIER = ID 2 |
| | DISK STORAGE UNIT IDENTIFIER = ID 3 |
| | DATA TRANSFER DIRECTION = WRITE |
| | CODE CONVERSION MODE = Source Code Type = B. Destination Code Type = A |
| CODE CONVERSION TYPE 8 | HOST COMPUTER IDENTIFIER = ID 2 |
| | DISK STORAGE UNIT IDENTIFIER = ID 4 |
| | DATA TRANSFER DIRECTION = WRITE |
| | CODE CONVERSION MODE = Source Code Type = B. Destination Code Type = B |

FIG. 6

DISK CONTROL APPARATUS

BACKGROUND OF THE INVENTION

The present invention relates to a disk control apparatus and, more particularly, to a disk control apparatus in an information processing system (to be simply referred to as a system hereinafter) in which host computers using different coding schemes share data.

In a system in which a plurality of host computers using different coding schemes (e.g., ASCII (American Standard Code for Information Interchange) and EBCDIC (Extended Binary Coded Decimal Interchange Code)) share data, data to be processed by a given host computer must be converted into data complying with the coding scheme used in the host computer. Conventionally, such data is stored first in the main storage in the host computer, and the host computer then performs code conversion processing by software or hardware means.

Japanese Patent Laid-Open Nos. 61-253673 (reference 1) and 5-67023 (reference 2) are the prior arts associated with the present invention. The "Code Converting System for Magnetic Disk Device" disclosed in reference 1 aims at a magnetic disk device that converts stored data into a predetermined code, writes the code on a magnetic disk upon modulation, converts the code read out from the magnetic disk into the original data, and outputs it. This system is not designed for conversion of the coding scheme of data to be processed by a host computer as in the present invention.

According to the "Code Conversion Processing System for Magnetic Disk Writing", the time required for code conversion is shortened by simultaneously executing disk seek processing and code conversion processing. Similar to the "Code Converting System for Magnetic Disk Device" disclosed in reference 1, this system is not designed for conversion of the coding scheme of data to be processed by a host computer.

In the prior arts described above, when code conversion processing for data is to be performed by a host computer using a software means in accordance with a program, the processing efficiency of the host computer decreases.

In addition, when code conversion processing for data is to be performed by conversion circuits prepared as hardware means in a host computer, such conversion circuits must be prepared for the respective channels in the host computer, resulting in an increase in system size.

SUMMARY OF THE INVENTION

It is an object of the present invention to provide a disk control apparatus that obviates the necessity of code conversion processing for data in a host computer.

In order to achieve the above object, according to the present invention, there is provided a disk control apparatus comprising control means for analyzing read/write commands transmitted from a plurality of host computers using different coding schemes, and recognizing a code conversion mode which indicates execution/inexecution of code conversion and a code conversion direction, and code conversion means for performing code conversion for data to be read/write from/in a plurality of disk storage units using different coding schemes.

BRIEF DESCRIPTION OF THE DRAWINGS

FIG. 1 is a block diagram showing a disk control apparatus according to the first embodiment of the present invention;

FIG. 2 is a view for explaining the contents of a read/write command with a code conversion type in FIG. 1;

FIG. 3 is a view showing the contents of a code conversion code storage circuit in FIG. 1;

FIG. 6 is a view showing the details of the code conversion type registration table in FIG. 5.

DESCRIPTION OF THE PREFERRED EMBODIMENTS

Figure 4:
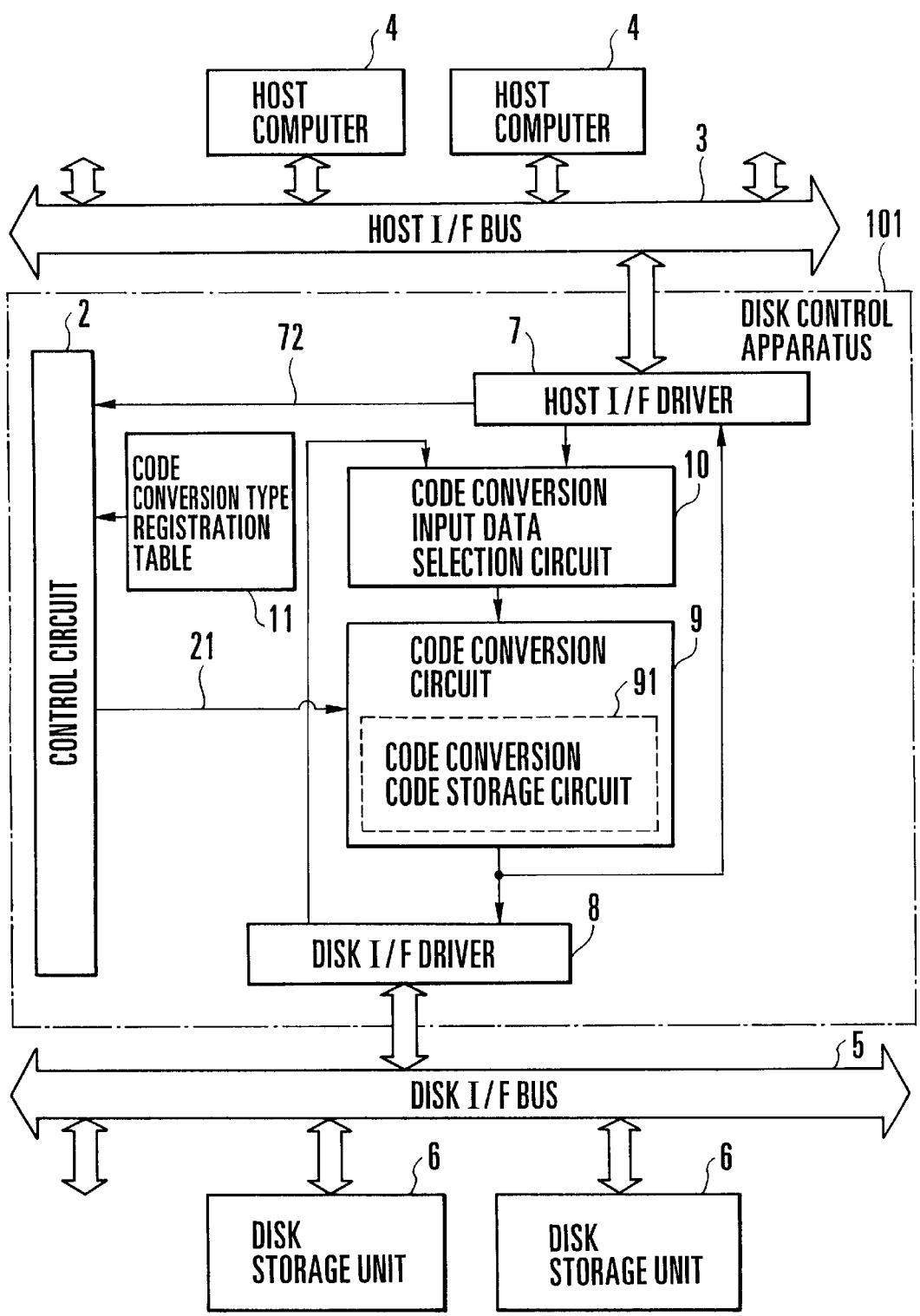
FIG. 4 is a block diagram showing a disk control apparatus according to the second embodiment of the present invention.

The present invention will be described in detail below with reference to the accompanying drawings.

FIG. 1 shows a disk control apparatus 1 according to the first embodiment of the present invention. Referring to FIG. 1, the disk control apparatus 1 includes a control circuit 2, a host interface (I/F) driver 7, a disk I/F driver 8, a code conversion circuit 9, and a code conversion input data selection circuit (to be referred to as a data selection circuit hereinafter) 10. The disk control apparatus 1 having this arrangement is connected to a plurality of host computers 4a and 4b through a host I/F bus 3, and is also connected to a plurality of disk storage units 6a and 6b through a disk I/F bus 5.

The control circuit 2 analyzes read/write commands 71 with code conversion types output from the host computers 4a and 4b through the host I/F bus 3 and the host I/F driver 7 to identify the code conversion types, and notifies the code conversion circuit 9 of code conversion modes 21 corresponding to combinations of conversion source coding schemes and conversion destination coding schemes.

The host I/F driver 7 transmits/receives data to/from a host computer 4 through the host I/F bus 3. The disk I/F driver 8 transmits/receives data to/from a disk storage unit 6 through the disk I/F bus 5.

The code conversion circuit 9 converts the data input from the data selection circuit 10 in accordance with the code conversion mode designated by the code conversion mode parameter 21 from the control circuit 2, and outputs the resultant code to the host I/F driver 7 and the disk I/F driver 8. The code conversion circuit 9 includes a code conversion code storage circuit (to be referred to as a code storage circuit hereinafter) 91 used for code conversion.

The data selection circuit 10 selects data from the disk I/F driver 8 and sends it to the code conversion circuit 9 when the host computers 4a and 4b are to read out data from the disk storage units 6. When the host computers 4a and 4b are to write data in the disk storage units 6a and 6b, the data selection circuit 10 selects data from the host I/F driver 7 and sends it to the code conversion circuit 9.

FIG. 2 shows the structure of the read/write command 71 with the code conversion type to be used when a SCSI (Small Computer Systems Interface) is used as a host I/F. According to the SCSI specifications, extended commands can be defined. In this case, a command code is designated by byte 0, and a read command code with a code conversion type and a write command code with a code conversion type are respectively represented by E8h (h indicates a hexadecimal number) and EAh.

The read/write command 71 with the code conversion type defines a code conversion type, with byte 6, which designates a conversion source coding scheme and a conversion designation coding scheme as a parameter to be newly added from a standard read/write command. More specifically, bits 7 to 4 of byte 6 are assigned to the conversion source coding scheme (Source Code Type), and bits 3 to 0 are assigned to the conversion destination coding scheme (Destination Code Type). For example, a 4-bit binary number is uniquely assigned to a coding scheme such that "0001" ("" indicates a binary number) represents the ASCII coding scheme, and "0010" represents the EBCDIC coding scheme.

The control circuit 2 identifies the conversion source coding scheme and conversion destination coding scheme designated by the code conversion types and recognizes the code conversion mode 21. If, for example, Source Code and Destination Code of the code conversion type indicate the same coding scheme like "Source Code=ASCII, Destination Code=ASCII", Destination Code=ASCII" or "Source Code= EBCDIC, Destination Code=EBCDIC", the code conversion mod 21 is set as "inexecution of code conversion".

If the code conversion type is "Source Code=ASCII, Destination Code =EBCDIC", the code conversion mode 21 is set as execution of code conversion (ASCII→EBCDIC)". If the code conversion type is "Source Code=EBCDIC, Destination Code ASCII", the code conversion mode 21 is set as "execution of code conversion (EBCDIC→ASCII)".

Bytes 2 to 5 of the read/write command 71 with the code conversion type are designated as a transfer start address (Logical Block Address), and bytes 7 and 8 are designated as a transfer length (Block Length), as in the case with a standard read/write command. The remaining parameters of the read/write command 71 with the code conversion type comply with the corresponding parameters of the standard read/write command.

LUNs (Logic Unit Numbers) are respectively assigned to the disk storage units 6a and 6b under the control of the disk control apparatus 1. The host computers 4a and 4b designate the LUNs to determine the disk storage units 6a and 6b to be accessed. In SCSI, each disk storage unit to be accessed is designated by using an LUN field in an Identify message or CDB (Control Data Block).

FIG. 3 shows the contents of the code storage circuit 91 installed in the code conversion circuit 9. The code conversion circuit 9 incorporates the code storage circuit 91 having a ROM (Read Only Memory) table storing output data (Output Data) at each address consisting of code conversion mode (Code Conversion Mode 21) data of upper eight bits and input data (Input Data) of lower eight bits.

Data corresponding to the code conversion mode 21 for conversion for each system is written in the code storage circuit 91. The code conversion circuit 9 reads out output data by inputting an address consisting of a code conversion mode 21 of upper eight bits and input data of lower eight bits to the code storage circuit 91, thereby performing code conversion processing.

For example, Code Conversion Mode ="00000000" is assigned to a code conversion type indicating "inexecution of code conversion"; Code Conversion Mode "00000001", to a code conversion type indicating "execution of code conversion (ASCII→EBCDIC)"; and Code Conversion Mode="00000010", to a code conversion type indicating "execution of code conversion (EBCDIC→ASCII)". In this manner, an 8-bit binary number is uniquely assigned to each code conversion mode 21.

If the code conversion mode 21 indicates that data "00000000" is to be converted in the "execution of code conversion (ASCII→EBCDIC)" mode, Output Data at address "0000000100000000" consisting of upper eight bits of "00000001" as Code Conversion Mode and lower eight bits of "00000000" as Input Data is read out from the code storage circuit 91. With this operation, code conversion can be performed.

The operation of the disk control apparatus 1 having this arrangement will be described next with reference to FIGS. 1 to 3.

When the host computers 4a and 4b are to read/write data out/in the disk storage unit 6, the host computers 4a and 4b set code conversion type parameters to issue the read/write commands 71 with the code conversion types. In each code conversion type parameter, a conversion source coding scheme (Source Code) and a conversion destination coding scheme (Destination Code) are set.

Upon reception of the read commands with the code conversion types from the host computers 4a and 4b, the disk control apparatus 1 performs code conversion for data in accordance with the settings of the code conversion type parameters.

More specifically, upon reception of the read commands 71 with the code conversion types from the host computers 4a and 4b, the control circuit 2 identifies the code conversion type parameters from the read commands 71 with the code conversion types, and notifies the code conversion circuit 9 of the code conversion modes 21 in accordance with combinations of conversion source coding schemes and conversion destination coding schemes.

Each data read out from the disk storage unit 6 is sent to the data selection circuit 10 through the disk I/F driver 8. The data selection circuit 10 selects the data from the disk I/F driver 8 and sends it to the code conversion circuit 9.

The code conversion circuit 9 reads out data from the code storage circuit 91 in accordance with the address consisting of the code conversion mode 21 of upper eight bits and the conversion target data of lower eight bits, and outputs the data. If "execution of code conversion (X→Y)" mode is set, the data based on a coding scheme X is converted into data based on a coding scheme Y, and the converted data is output. If "inexecution of code conversion" mode is set, the input data is output without being converted.

The data output from the code conversion circuit 9 are transmitted to the host computers 4a and 4b through the host I/F driver 7 and the host I/F bus 3.

Upon reception of the write commands 71 with the code conversion types from the host computers 4a and 4b, the control circuit 2 identifies the code conversion type parameters from the write commands 71 with the code conversion types, and notifies the code conversion circuit 9 of the code conversion modes 21 corresponding to combinations of conversion source coding schemes and conversion destination coding schemes.

The data sent from the host computers 4a and 4b are sent to the data selection circuit 10 through the host I/F bus 3 and the host I/F driver 7. The data selection circuit 10 selects the data from the host I/F driver 7 and sends it to the code conversion circuit 9.

The code conversion circuit 9 reads out data from the code storage circuit 91 in accordance with each address consisting of the code conversion mode 21 of upper eight bits and the conversion target data of lower eight bits, and outputs the data. If the "execution of code conversion (X→Y)" mode is set, the code conversion circuit 9 converts the data based on the coding scheme X to data based on the coding scheme Y, and outputs the converted data. If the "inexecution of code conversion" mode is set, the code conversion circuit 9 outputs the input data without converting it.

The data output from the code conversion circuit 9 are transmitted to the disk storage units 6a and 6b through the disk I/F driver 8 and the disk I/F bus 5.

Assume that the host computer 4a for processing data under a given coding scheme A and the host computer 4b for processing data under another coding scheme B are connected to the host I/F bus 3. Assume also that the disk storage unit 6a in which data based on the coding scheme A is written and the disk storage unit 6b in which data based on the coding scheme B is written are connected to the disk I/F bus 5. The operation of this arrangement will be described below.

When the host computer 4a is to read out data from the disk storage unit 6a, no code conversion is required. The host computer 4a therefore issues a standard read command or the read command 71 with the code conversion type in which the code conversion type parameter is set to "Source Code=A, Destination Code A". The code conversion mode 21 becomes "inexecution of code conversion", and the data based on the coding scheme A is sent to the host computer 4a.

When the host computer 4b is to read out data from the disk storage unit 6b, no code conversion is required. The host computer 4b therefore issues a standard read command or the read command 71 with the code conversion type in which the code conversion type parameter is set to "Source Code=B, Destination Code=B". The code conversion mode 21 becomes "inexecution of code conversion", and the data based on the coding scheme B is sent to the host computer 4b.

When the host computer 4a is to read out data from the disk storage unit 6b, code conversion is required because of the different coding schemes. The host computer 4a therefore issues the read command 71 with the code conversion type in which the code conversion mode parameter 21 is set to "Source Code=B, Destination Code=A". The code conversion mode 21 becomes "execution of code conversion (B→A)", and hence the disk control apparatus i converts the data based on the coding scheme B in the disk storage unit 6b into data based on the coding scheme A, and transmits the converted data to the host computer 4a.

Similarly, when the host computer 4b is to read out data from the disk storage unit 6a, code conversion is required because of the different coding schemes. The host computer 4b therefore issues the read command 71 with the code conversion type in which the code conversion mode parameter 21 is set to "Source Code =A, Destination Code=B". The code conversion mode 21 becomes "execution of code conversion (A→B)", and hence the disk control apparatus 1 converts the data based on the coding scheme A in the disk storage unit 6a into data based on the coding scheme B, and transmits the converted data to the host computer 4b.

In either case, the data received by the host computers 4a and 4b are data based on the coding schemes used by the host computers 4a and 4b.

When the host computer 4a is to update the data in the disk storage unit 6a, no code conversion is required. The host computer 4a therefore issues a standard write command or the write command 71 with the code conversion type in which the code conversion type parameter is set to "Source Code=A, Destination Code=A". The code conversion mode 21 becomes "inexecution of code conversion", and hence the data based on the coding scheme A is sent and written in the disk storage unit 6a.

When the host computer 4b is to update the data in the disk storage unit 6b, no code conversion is required. The host computer 4b therefore issues a standard write command or the write command 71 with the code conversion type in which the code conversion type parameter is set to "Source Code=By Destination Code=B". The code conversion mode 21 becomes "inexecution of code conversion", and hence the data based on the coding scheme B is sent and written in the disk storage unit 6b.

When the host computer 4a is to update the data in the disk storage unit 6b, code conversion is required because of the different coding schemes. The host computer 4a therefore issues the write command 71 with the code conversion type in which the code conversion type parameter is set to "Source Code=A, Destination Code=B". The code conversion mode 21 becomes "execution of code conversion (A→B), and hence the disk control apparatus 1 converts the data based on the coding scheme A in the host computer 4a into data based on the coding scheme B, thus updating the data in the disk storage unit 6b.

Similarly, When the host computer 4b is to update the data in the disk storage unit 6a, code conversion is required because of the different coding schemes. The host computer 4b therefore issues the write command 71 with the code conversion type in which the code conversion type parameter is set to "Source Code=B, Destination Code=A". The code conversion mode 21 becomes "execution of code conversion (B→A), and hence the disk control apparatus 1 converts the data based on the coding scheme B in the host computer 4b into data based on the coding scheme A, thus updating the data in the disk storage unit 6a.

In either case, the host computers 4a and 4b can send data based on the coding schemes used therein to the disk control apparatus 1 without any change.

According to the disk control apparatus of this embodiment, when a host computer is to read out data from a disk storage unit, the disk control apparatus converts the code of the data from the disk storage unit, and sends the resultant data to the host computer. The data received by the host computer is therefore data based on the coding scheme used in the host computer. When a host computer is to write data in a disk storage unit, the disk control apparatus converts the data from the host computer and sends the resultant data to the host computer. The host computer can therefore output the data based on the coding scheme used therein without any change. For this reason, conversion processing for data codes is not required in each host computer.

FIG. 4 shows a disk control apparatus according to the second embodiment of the present invention.

Referring to FIG. 4, a disk control apparatus 101 of the second embodiment incorporates a code conversion type registration table (to be referred to as a registration table hereinafter) 11 having a plurality of data conversion types 22 registered to identify a code conversion mode even if a general read/write command 72 is used, unlike the disk control apparatus 1 of the first embodiment, which uses the read/write command 71 with a code conversion type to identify a code conversion mode. The remaining elements are the same as those in FIG. 1 and denoted by the same reference numerals as in FIG. 1, and hence a description thereof will be omitted.

Figure 5:
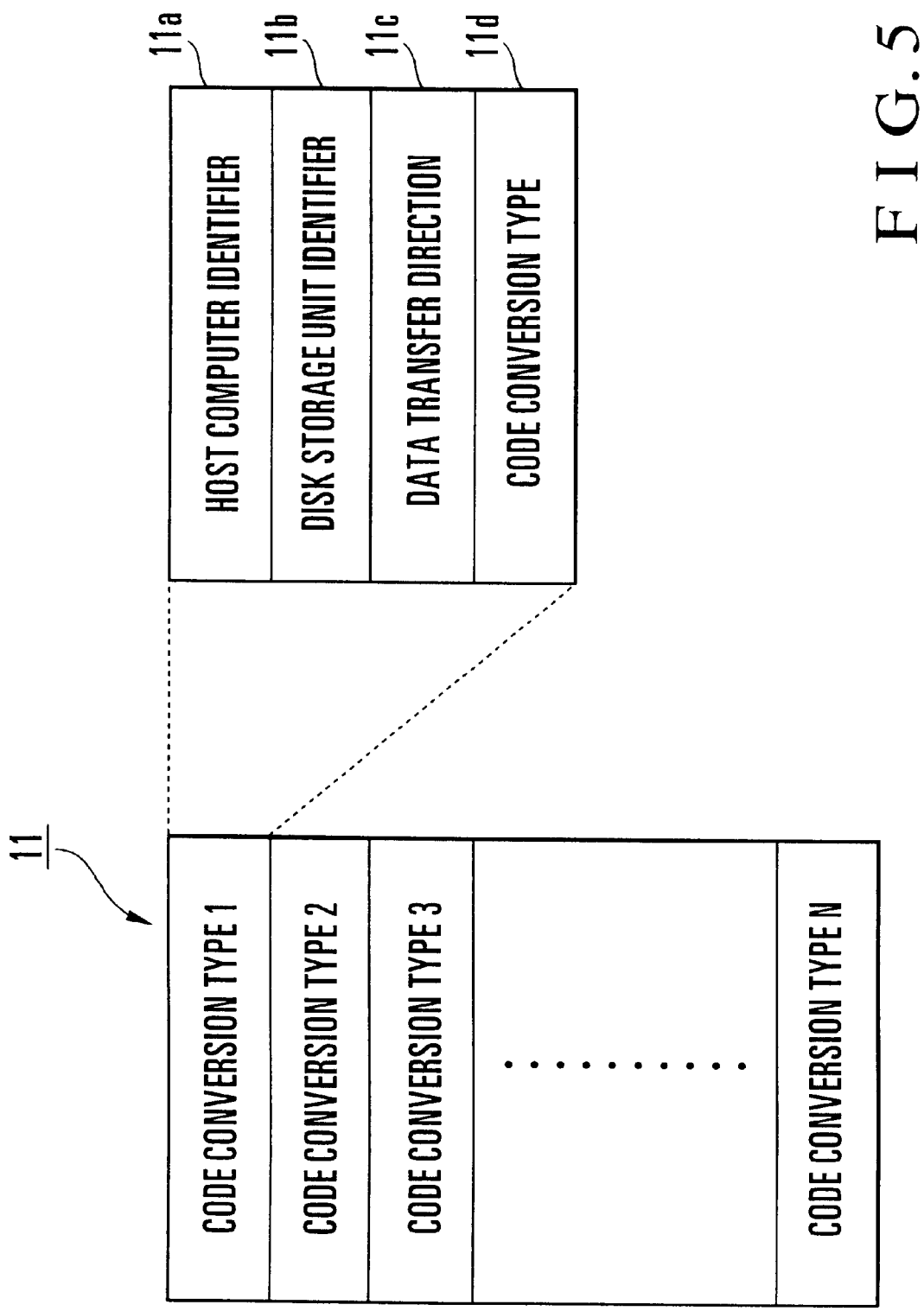
FIG. 5 is a view showing the contents of a code conversion type registration table in FIG. 4.

FIG. 5 shows the contents the registration table 11. Referring to FIG. 5, in the registration table 11, code conversion types 1 to N (N is a positive integer) are registered in correspondence with the respective combinations of host computers 4a and 4b and disk storage units 6a and 6b. Each of code conversion types 1 to N has fields 11a to 11d for a host computer identifier, a disk storage unit identifier, a data transfer direction, and a code conversion type.

In the host computer identifier field 11a, an identifier for identifying the host computer 4a or 4b is stored. When SCSI as a standard interface is to be used, a SCSI ID is used as an identifier. In the disk storage unit identifier field 11b, an identifier for identifying the disk storage unit 6a or 6b is stored.

In the data transfer direction field 11c, the transfer direction of data to be exchanged between the host computer 4a or 4b and the disk storage unit 6a or 6b is stored. When data is to be sent from the host computer 4a or 4b to the disk storage unit 6a or 6b, "write" is registered as a transfer direction. When data is to be sent from the disk storage unit 6a or 6b to the host computer 4a or 4b, "read" is registered as a transfer direction.

In the code conversion type field 11d, a coding scheme before conversion and a coding scheme after conversion are stored. The format of this data may be the same as that of the read/write command 71 with a code conversion type in the first embodiment. FIG. 6 shows the details of the contents of the registration table 11 in FIG. 5.

The operation of the disk control apparatus 101 having this arrangement will be described next with reference to FIGS. 4 to 6.

When the host computer 4a or 4b is to read/write data from/in the disk storage unit 6a or 6b, the host computer issues a general read/write command including a transfer start address, transfer length, and the like as parameters.

Upon reception of a read or write command from a host computer 4 through a host I/F bus 3, the disk control apparatus 101 recognizes the identifier of the host computer 4a or 4b that has issued the command, the identifier of the disk storage unit 6a or 6b to which the data is to be transferred, and the data transfer direction, and searches the registration table 11 for a code conversion type corresponding to the hoot computer identifier, the disk storage unit identifier, and the data transfer direction. The disk control apparatus 101 performs data code conversion in accordance with the corresponding code conversion type.

More specifically, upon reception of the read command 72 from the host computer 4a or 4b, a control circuit 2 searches the registration table 11 to notify a code conversion circuit 9 of a code conversion mode 21 corresponding to a combination of a conversion source coding scheme and a conversion destination coding scheme indicated by the code conversion type corresponding to the host computer identifier, the disk storage unit identifier, and the data transfer direction.

The data read out from the disk storage unit 6a or 6b is sent to a data selection circuit 10 through a disk I/F bus 5 and a disk I/F driver 8. The data selection circuit 10 selects the data from the disk I/F driver 8 and sends it to the code conversion circuit 9.

The code conversion circuit 9 reads out data from a code storage circuit 91 in accordance with an address consisting of a code conversion mode 21 of upper eight bits and conversion target data of lower eight bits, and outputs the data. If the "execution of code conversion (X→Y) mode is set, the code conversion circuit 9 converts the data based on a coding scheme X into data based on a coding scheme Y, and outputs the resultant data. If the "inexecution of code conversion" mode is set, the code conversion circuit 9 outputs the input data without converting it.

The data output from the code conversion circuit 9 is transmitted to the host computer 4a or 4b, which has the host computer identifier, through a host I/F driver 7 and the host I/F bus 3.

Upon reception of a write command from the host computer 4a or 4b, the control circuit 2 searches the registration table 11 to notify the code conversion circuit 9 of the code conversion mode 21 corresponding to a combination of a conversion source coding system and a conversion destination coding scheme indicated by the code conversion type corresponding to the host computer identifier, the disk storage unit identifier, and the data transfer direction.

The data sent from the host computer 4a or 4b is sent to the data selection circuit 10 through the host I/F bus 3 and the host I/F driver 7. The data selection circuit 10 selects the data from the host I/F driver 7 and sends it to the code conversion circuit 9.

The code conversion circuit 9 reads out data stored in the code storage circuit 91 at the address consisting of the code conversion mode of upper eight bits and the conversion target data of lower eight bits, and outputs the data. If the "execution of code conversion (X→Y)" mode is set, the code conversion circuit 9 converts the data based on the coding scheme X to data based on the coding scheme Y, and outputs the resultant data. If the "inexecution of code conversion" mode is set, the code conversion circuit 9 output the input data without converting it.

The data output from the code conversion circuit 9 is transmitted to the disk storage unit 6a or 6b, which has the disk storage unit identifier, through the disk I/F driver 8 and the disk I/F bus 5.

Assume that the host computer 4a for processing data under a given coding scheme A and the host computer 4b for processing data under another coding scheme B are connected to the host I/F bus 3. Assume also that the disk storage unit 6a in which data based on the coding scheme A is written and the disk storage unit 6b in which data based on the coding scheme b is written are connected to the disk I/F bus 5. The operation of this arrangement will be described below.

Assume that the identifier of the host computer 4a is "ID1"; the identifier of the host computer 4b, "ID2"; the identifier of the disk storage unit 6a, "ID3"; and the identifier of the disk storage unit 6b, "ID4". In this case, eight code conversion types 1 to 8 are registered in the registration table 11. FIG. 6 shows the contents of the code conversion type registration table 11.

Referring to FIG. 6, when the host computer 4a is to read out data from the disk storage unit 6a, since the identifiers of the host computer 4a and disk storage unit 6a are respectively "ID1" and "ID3" and the data transfer direction is "read", "code conversion type 1" is searched out from the registration table 11. Since code conversion type 1" indicates "Source Code A, Destination Code=A", the disk control apparatus 101 recognizes that the code conversion mode is "inexecution of code conversion". The data based on the coding scheme A is sent from the disk storage unit 6a to the host computer 4a without being converted.

Similarly, when the host computer 4b is to read out data from the disk storage unit 6b, since the identifiers of the host computer 4b and disk storage unit 6b are respectively "ID2" and "ID4" and the data transfer direction is "read", "code conversion type 4" is searched out from the registration table 11. Since "code conversion type 4" indicates "Source Code=B, Destination Code=B", the disk control apparatus 101 recognizes that the code conversion mode is "inexecution of code conversion". The data based on the coding scheme B is sent from the disk storage unit 6b to the host computer 4b without being converted.

When the host computer 4a is to read out data from the disk storage unit 6b, since the identifiers of the host computer 4a and disk storage unit 6b are respectively "ID1" and "ID4" and the data transfer direction is "read", "code conversion type 2" is searched out from the registration table 11. Since "code conversion type 2" indicates "Source Code= B, Destination Code=A", the disk control apparatus 101 recognizes that the code conversion mode is "execution of code conversion (B→A)". The data based on the coding scheme B from the disk storage unit 6b is therefore converted into data based on the coding scheme A and transmitted to the host computer 4a.

Similarly, when the host computer 4b is to read out data from the disk storage unit 6a, since the identifiers of the host computer 4b and disk storage unit 6a are respectively "ID2" and "ID3" and the data transfer direction is "read", "code conversion type 3" is searched out from the registration table 11. Since "code conversion type 3" indicates "Source Code= A, Destination Code=B", the disk control apparatus 101 recognizes that the code conversion mode is "execution of code conversion (A→B)". The data based on the coding scheme A from the disk storage unit 6a is therefore converted into data based on the coding scheme B and transmitted to the host computer 4b.

In either case, the data received by the host computers 4a and 4b are data based on the coding schemes used in the host computers 4a and 4b.

When the host computer 4a is to update the data in the disk storage unit 6a, since the identifiers of the host computer 4a and disk storage unit 6a are respectively "ID1" and "ID3" and the data transfer direction is "write", "code conversion type 5" is searched out from the registration table 11. Since "code conversion type 5" indicates "Source Code= A, Destination Code=A", the disk control apparatus 101 recognizes that the code conversion mode is "inexecution of code conversion". The data based on the coding scheme A from the host computer 4a is sent and written in the disk storage unit 6a without being converted.

Similarly, when the host computer 4b is to update the data in the disk storage unit 6b, since the identifiers of the host computer 4b and disk storage unit 6b are respectively "ID2" and "ID4" and the data transfer direction is "write", "code conversion type 8" is searched out from the registration table 11. Since "code conversion type 8" indicates "Source Code= B, Destination Code=B", the disk control apparatus 101 recognizes that the code conversion mode is "inexecution of code conversion". The data based on the coding scheme B from the host computer 4b is sent and written in the disk storage unit 6b without being converted.

When the host computer 4a is to update the data in the disk storage unit 6b, since the identifiers of the host computer 4a and disk storage unit 6b are respectively "ID1" and "ID4" and the data transfer direction is "write", "code conversion type 6" is searched out from the registration table 11. Since "code conversion type 6" indicates "Source Code= A, Destination Code=B", the disk control apparatus 101 recognizes that the code conversion mode is "execution of code conversion (A→B)". The data based on the coding scheme A from the host computer 4a is therefore converted into data based on the coding scheme B. The converted data is written in the disk storage unit 6b.

Similarly, when the host computer 4b is to update the data in the disk storage unit 6a, since the identifiers of the host computer 4b and disk storage unit 6a are respectively "ID2" and "ID3" and the data transfer direction is "write", "code conversion type 7" is searched out from the registration table 11. Since "code conversion type 7" indicates "Source Code= B, Destination Code=A", the disk control apparatus 101 recognizes that the code conversion mode is "execution of code conversion (B→A)". The data based on the coding scheme B from the host computer 4b is therefore converted into data based on the coding scheme A. The converted data is written in the disk storage unit 6a.

In either case, the host computers 4a and 4b can send the data based on the coding schemes used in the host computers 4a and 4b to the disk storage units 6a and 6b without any change.

As has been described above, according to the present invention, if the disk control apparatus converts a data coding scheme, the coding scheme used by a host computer can be used for data to be sent from the host computer. This is because code conversion can be performed for data exchanged between host computers and disk storage units by using read commands containing code conversion type data or write commands with code conversion type data or preparing a code conversion type registration table in which data code conversion types are stored in correspondence with the respective combinations of host computers and disk storage units.

In addition, since data received by each host computer has been converted into data based on the coding scheme used in the host computer, no code conversion processing is required in the host computer. This improves the processing efficiency of the host computer. This is because code conversion can be performed for data exchanged between host computers and disk storage units by using read commands containing code conversion type data or write commands with code conversion type data or preparing a code conversion type registration table in which data code conversion types are stored in correspondence with the respective combinations of host computers and disk storage units.

What is claimed is:

1. A disk control apparatus comprising:
   a control device for analyzing read/write commands transmitted from a plurality of host computers using different coding schemes, and recognizing a code conversion mode which indicates execution/inexecution of code conversion and a code conversion direction; and
   a code conversion device for performing code conversion for data to be read/write from/in a plurality of disk storage units using different coding schemes; and
   a registration table storing code conversion types indicating combinations of said host computers and said disk storage units;
   wherein said control device refers to said registration table to recognize the code conversion mode by specifying a combination of said host computer and said disk storage unit on the basis of an analysis result on a read/write command with a code conversion type from said host computer, and
   the code conversion type stored in said registration table comprises a host computer identifier, a disk storage unit identifier, a data transfer direction, and a code conversion mode.

2. An apparatus according to claim 1, wherein the host computer identifier is a SCSI (Small Computer Systems Interface) ID.

3. A disk control apparatus comprising:
   a control device for analyzing read/write commands transmitted from a plurality of host computers using different coding schemes, and recognizing a code conversion mode which indicates execution/inexecution of code conversion and a code conversion direction; and a code conversion device for performing code conversion for data to be read/write from/in a plurality of disk storage units using different coding schemes, wherein said code conversion device comprises a code storage device for receiving a code conversion mode parameter outputted from said control device and data to be read/written from/in said disk storage unit, and outputting data having undergone code conversion, and said code storage device comprises a memory in the form of a table in which data having undergone code conversion is stored in advance at an address including a code conversion mode parameter, output from said control device, as an upper address, and data to be read/written from/in said disk storage unit as a lower address.

4. A disk control apparatus comprising:

a control device for analyzing read/write commands transmitted from a plurality of host computers using different coding schemes, and recognizing a code conversion mode which indicates execution/inexecution of code conversion and a code conversion direction; and a code conversion device for performing code conversion for data to be read/write from/in a plurality of disk storage units using different coding schemes;

a registration table storing code conversion types indicating combinations of said host computers and said disk storage units, wherein said control device refers to said registration table to recognize the code conversion mode by specifying a combination of said host computer and said disk storage unit on the basis of an analysis result on a read/write command with a code conversion type from said host computer; and a registration table comprising a host computer identifier, a disk storage unit identifier, a data transfer direction, and a code conversion mode, wherein said control device refers to said registration table to determine the code conversion mode to perform.

5. An apparatus according to claim 4, wherein the code conversion mode to perform is determined using the registration table based on a host computer identifier, a disk storage unit identifier, and a data transfer direction.

6. An apparatus according to claim 5, further comprising:

a code storage device comprising a memory in the form of a table in which data having undergone code conversion is stored in advance at an address including a code conversion mode parameter, output from said control device, as an upper address, and data to be read/written from/in said disk storage unit as a lower address.

7. A disk control apparatus comprising:

a control device for analyzing read/write commands transmitted from a plurality of host computers using different coding schemes, and recognizing a code conversion mode which indicates execution/inexecution of code conversion and a code conversion direction; and a code conversion device for performing code conversion for data to be read/write from/in a plurality of disk storage units using different coding schemes;

a registration table storing code conversion types indicating combinations of said host computers and said disk storage units, wherein said control device refers to said registration table to recognize the code conversion mode by specifying a combination of said host computer and said disk storage unit on the basis of an analysis result on a read/write command with a code conversion type from said host computer; and a code storage device comprising a memory in the form of a table in which data having undergone code conversion is stored in advance at an address including a code conversion mode parameter, output from said control device, as an upper address, and data to be read/written from/in said disk storage unit as a lower address.

* * * * *